H. DIXON.
NUT LOCK STRUCTURE.
APPLICATION FILED MAR. 6, 1916.
1,204,548.
Patented Nov. 14, 1916.
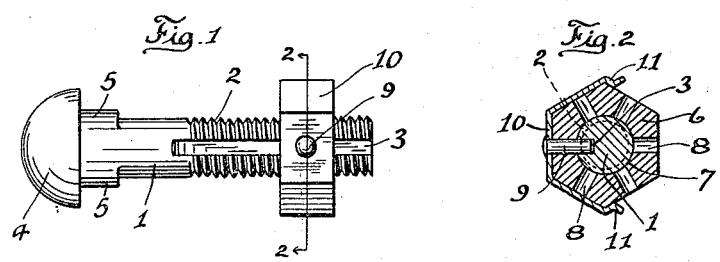
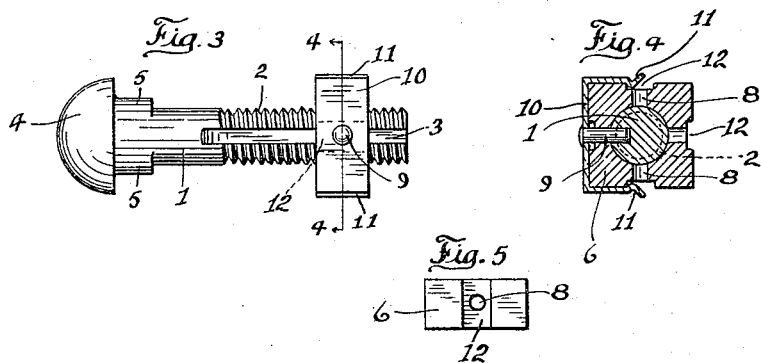
Witnesses
R. M. McCormick
A. L. Phelps
Inventor
Harry Dixon
By
C. C. Shepherd, Attorney

UNITED STATES PATENT OFFICE.

HARRY DIXON, OF CHILLICOTHE, OHIO.

NUT-LOCK STRUCTURE.

1,204,548.  Specification of Letters Patent.  Patented Nov. 14, 1916.

Application filed March 6, 1916. Serial No. 82,309.

*To all whom it may concern:*

Be it known that I, HARRY DIXON, a citizen of the United States, residing at Chillicothe, in the county of Ross and State of Ohio, have invented certain new and useful Improvements in Nut-Lock Structures, of which the following is a specification.

My invention relates to nut lock structures so arranged that, under normal conditions, it will be a physical impossibility to remove either the bolt from its operative position, or the nut holding the same in such position.

The main object of my invention, therefore, resides in the combination of a bolt having a longitudinal groove therein and a centrally threaded nut body provided with openings arranged so that a pin may be removably placed through any of the openings to register with the groove to thereby hold the nut against rotation.

Still a further object resides in a structure for holding this pin in its applied position, which is made of spring material whereby it is resiliently and removably held in position to hold the pin in its operative position.

The preferred embodiment of my invention is shown in the accompanying sheet of drawings, in which similar characters of reference designate corresponding parts, and in which:

Figure 1 is a view in side elevation of a bolt and hexagonal nut equipped in accordance with my invention, Fig. 2 is a section taken on line 2—2 of Fig. 1, Fig. 3 is a view in side elevation of a bolt and square nut equipped in accordance with my invention, Fig. 4 is a section taken on line 4—4 of Fig. 3, and, Fig. 5 is a side view of the square nut shown in Fig. 4 with the spring clip removed.

In these several views, the bolt body is designated by the reference numeral 1, this bolt being provided with a threaded shank as is shown at 2 and this shank is provided with a longitudinal slot 3. The head 4 of this bolt may be of any desired type and the shank is preferably additionally provided with shouldered portions such as are shown at 5 to prevent the bolt itself from turning when it is inserted into a hole of the proper shape or a hole conforming with the general contour of the shank section at 5. The nut body is designated 6 and is shown as having a centrally arranged threaded aperture 7 to coöperate with the threads shown at 2. This nut is also provided with a plurality of radially arranged holes or openings 8 of a size to comfortably receive the pin designated 9. This pin is rigidly secured to a clip member 10 and the pin is of such length that it will seat itself in the groove 3 after it passes through one of the holes 8 in the nut 6. The style of this clip may vary in accordance with the nut on which it is to be used. In Fig. 2, I have shown it as being formed with three sides and the extreme ends of the outer sides being crimped to project outwardly as is shown at 11. The clip itself being made of spring metal, the ends will resiliently engage opposed corners of the nut body in the manner indicated. In Fig. 4 this same idea has been extended to use in connection with a square nut and in this instance the nut is shown as being provided with a plurality of longitudinally arranged slots 12 into which the crimped ends 11 of the clip are designed to seat themselves. In either instance, this clip is removably and resiliently held in its applied position.

From the foregoing, it will be apparent that I have provided a structure which is in itself comparatively simple and which may very readily be utilized to lock a nut in its applied position. When used in connection with the shouldered portions 5, it is impossible for either the bolt or the nut to rotate when once the parts are in their operative position.

What I claim, is:

The combination with a bolt shank having a longitudinally arranged groove, a centrally threaded nut body having a plurality of laterally arranged openings therethrough, the side faces of said nut body being also grooved longitudinally, a spring clip embracing said nut body, the ends of said clip being crimped to seat themselves in certain of said nut body grooves, and a pin carried by said clip, said pin being of a length to pass through one of said openings and seat itself in said shank groove.

In testimony whereof I affix my signature in presence of two witnesses.

HARRY DIXON.

Witnesses:
F. B. KRAMER,
J. M. ALTON.

Copies of this patent may be obtained for five cents each, by addressing the "Commissioner of Patents, Washington, D. C."